United States Patent
Utesch

(10) Patent No.: US 9,080,006 B2
(45) Date of Patent: Jul. 14, 2015

(54) PRESSURE-SENSITIVE ADHESIVE COMPOUND

(75) Inventor: Nils Utesch, Shanghai (CN)

(73) Assignee: tesa SE, Hamburg (DE)

( * ) Notice: Subject to any disclaimer, the term of this patent is extended or adjusted under 35 U.S.C. 154(b) by 812 days.

(21) Appl. No.: 13/203,995

(22) PCT Filed: Feb. 16, 2010

(86) PCT No.: PCT/EP2010/051913
§ 371 (c)(1),
(2), (4) Date: Oct. 25, 2011

(87) PCT Pub. No.: WO2010/100025
PCT Pub. Date: Sep. 10, 2010

(65) Prior Publication Data
US 2012/0028020 A1   Feb. 2, 2012

(30) Foreign Application Priority Data
Mar. 4, 2009  (DE) .................. 10 2009 011 167

(51) Int. Cl.
| | |
|---|---|
| C08L 75/00 | (2006.01) |
| C08L 83/04 | (2006.01) |
| B32B 27/32 | (2006.01) |
| C08G 18/83 | (2006.01) |
| C08G 18/10 | (2006.01) |
| C09J 175/04 | (2006.01) |
| C08G 77/16 | (2006.01) |
| C08L 83/06 | (2006.01) |
| C08L 93/00 | (2006.01) |

(52) U.S. Cl.
CPC .............. *C08G 18/837* (2013.01); *C08G 18/10* (2013.01); *C09J 175/04* (2013.01); *C08G 77/16* (2013.01); *C08G 2170/40* (2013.01); *C08L 83/06* (2013.01); *C08L 93/00* (2013.01)

(58) Field of Classification Search
USPC ........................ 524/507, 588, 589; 428/220
See application file for complete search history.

(56) References Cited

U.S. PATENT DOCUMENTS

| | | |
|---|---|---|
| 6,703,463 B2 | 3/2004 | Holguin et al. |
| 2002/0098352 A1 | 7/2002 | Kishioka |
| 2005/0282024 A1 | 12/2005 | Sherman et al. |
| 2006/0008662 A1 | 1/2006 | Arai et al. |

(Continued)

FOREIGN PATENT DOCUMENTS

| | | |
|---|---|---|
| EP | 1 652 899 A1 | 5/2006 |
| JP | 2002363523 A | 12/2002 |

(Continued)

OTHER PUBLICATIONS

Technical data sheet of SILGRAP PSA6574 from Momentive, Oct. 2011.*
International Search Report dated May 26, 2010.

*Primary Examiner* — Aiqun Li
(74) *Attorney, Agent, or Firm* — Norris McLaughlin & Marcus PA

(57) ABSTRACT

The present invention relates to the use of an adhesive compound, in particular a pressure-sensitive adhesive compound, based on silylated polyurethanes for bonding optical components, in particular optical films, wherein the adhesive compound has a transmission according to ASTM D 1003 of greater than 86% and a haze according to ASTM D 1003 of less than 5%.

1 Claim, 2 Drawing Sheets

(56) References Cited

U.S. PATENT DOCUMENTS

Figure 1:
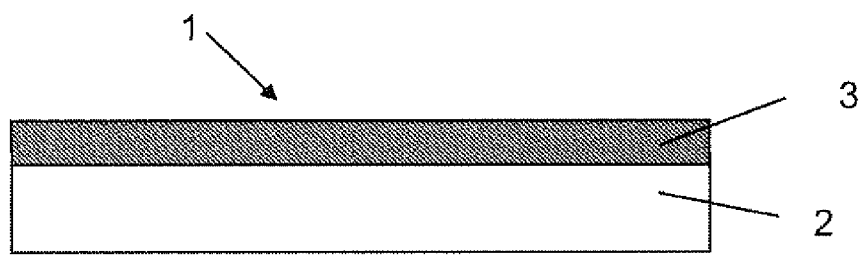

| | | |
|---|---|---|
| 2007/0129527 A1 | 6/2007 | Griswold |
| 2008/0058492 A1 | 3/2008 | Griswold |
| 2008/0114098 A1* | 5/2008 | Griswold et al. ............... 524/55 |
| 2010/0068534 A1* | 3/2010 | Paul et al. ..................... 428/429 |
| 2010/0147443 A1* | 6/2010 | Utesch et al. .................. 156/79 |

FOREIGN PATENT DOCUMENTS

| | | |
|---|---|---|
| JP | 200329298 A | 10/2003 |
| WO | 2006 118766 A1 | 11/2006 |

* cited by examiner

PRESSURE-SENSITIVE ADHESIVE COMPOUND

This application is a 371 of PCT/EP2010/051913, filed Feb. 16, 2010, which claims foreign priority benefit under 35 U.S.C. §119 of the German Patent Application No. 10 2009 011 167.0 filed Feb. 16, 2010, the disclosures of which are incorporated herein by reference.

The present invention relates to the use of a pressure-sensitive adhesive (PSA) for the adhesive bonding of optical components, more particularly optical films, in accordance with claim 1.

The uses of PSAs are nowadays very diverse. In the industrial sector, accordingly, there exist a very wide variety of applications. Adhesive tapes based on PSAs are used in particularly high numbers in the electronics segment or in the consumer electronics segment. Owing to the high number of units, PSA tapes can be processed here very rapidly and easily, meaning that other operations, such as riveting or welding, for example, would be too costly and complicated. Besides their normal joining function, these PSA tapes may also be required to take on additional functions. Examples there might include thermal conductivity, electrical conductivity or else an optical function. In the latter case, for example, PSA tapes are used which have light-absorbing or light-reflecting functions. Another optical function, for example, is a suitable transmission of light. Here, PSA tapes and PSAs are used that are very transparent, have no intrinsic coloration, and also possess high light stability.

In many cases, a PSA for optical purposes, in addition to the joining function, has the function of excluding air, since air has a refractive index of one, and the optical films or glasses have a refractive index which is generally much greater. At the transition from air to the optical component, the difference in refractive indices leads to a reflection, which reduces the transmission. One way of solving this problem is provided by antireflection coatings, which facilitate the transition of the light into the optical component, and reduce reflection. An alternative or additional option is to use an optical PSA which has a refractive index similar to that of the optical component. As a result, the reflection at the optical component is significantly minimized and the transmission is increased.

Typical applications include, for example, the bonding of touch panels to the LCD or OLED display, and the bonding of ITO films (indium tin oxide) for capacitive touch panels. The bonding of ITO films in particular poses a special challenge. Here, for instance, particular requirements are imposed on the neutrality of the PSA formulation. The PSA must not contain any acid functions, which, for example, on contact with ITO films, could adversely affect the electrical conductivity over a prolonged time period. Another requirement is the flow-on behavior. For example, many ITO films have structuring, typically microstructuring in the surface, which is to be filled by the PSA. This ought to take place without the inclusion of bubbles, since formation of bubbles would lessen the transmission.

For transparent adhesive bonds there are a multiplicity of acrylate PSAs known that are used in the optical segment. In U.S. Pat. No. 6,703,463 B2, JP 2002-363523 A or U.S. 2002/0098352 A1, acrylate PSAs are described which have different refractive indices. These adhesives, however, have disadvantages in the context of electrical neutrality relative to ITO films.

Furthermore, however, silicone PSAs are used as well. Adhesives of this kind are described by EP 1 652 899 B1. The silicone PSAs used therein, however, have only a very low bond strength and are therefore not suitable for the permanent adhesive bonds mentioned above. Further silicone PSAs are also described in U.S. 2006/008662 A1. The PSAs described here, as well, have only a low bond strength, and so are not suitable for permanent adhesive bonds.

Accordingly there continues to be a need for an improved optical PSA which does not have the disadvantages set out above. A suitable adhesive ought more particularly to have high optical transparency and also high UV stability. For the preferred application in the adhesive bonding of electrically conductive substrates, more particularly of ITO films, the adhesive ought to be inert in its behavior.

The present invention solves the problem described above, through the use of an adhesive in accordance with claim 1. Preferred embodiments and developments are subject matter of the respective dependent claims.

In accordance with the invention it has been recognized that moisture-crosslinking silylated polyurethane (PU) pressure-sensitive adhesives can be used advantageously. Silylated PU adhesives are isocyanate-free and are crosslinked via highly stable Si—O—Si bonds. On the basis of this stable network, silylated polyurethane adhesives are distinguished by chemical resistance toward solvents, water, acids, and alkalis. The weathering resistance toward atmospheric humidity, ozone, and UV light is correspondingly high. The resistant Si—O—Si network also guarantees high thermal robustness and shear resistance.

Silylated PU PSAs can be employed in particular to obtain the properties required for optical applications. For instance, the adhesives in accordance with ASTM D 1003 each had a transmittance of greater than 86% and a haze of less than 5%, and are therefore suitable especially for the bonding of optical components. On account of the good cohesion and adhesion properties, these adhesives are in particular also suitable for the bonding of flexible objects, examples being films. The haze value, a measure of the clouding of a substance, ought in one preferred version to have a value of less than 5% in accordance with ASTM D 1003. A high haze value denotes low visibility through the substance in question. The transmittance is preferably more than 86% at 550 nm, more preferably more than 88%.

PSAs based on silylated PUs are known per se and are freely available commercially; the prior art is documented in specifications including the following: U.S. 2007/129527 A1; U.S. 2008/0058492 A1; WO 2006/118766 A1.

Silylated polyurethane adhesives are produced in a 2-stage operation. A high-molecular-mass urethane prepolymer is generated by a reaction of selected di- or polyfunctional isocyanates (NCO) with selected polyols (OH). Depending on the original NCO/OH ratio of >1 or <1, this prepolymer may be either isocyanate- or hydroxyl terminated. Depending on the selected polymer and its end, it is reacted either with an amino-functional or with an isocyanato-functional trialkoxysilane. Solvents used are preferably esters or ketones, in order to obtain a very high molar mass on the part of the silylated polyurethane compositions. Since water is the key factor in the crosslinking of these adhesives, a solvent having a sufficient water-solubility ought to be selected both for the preparation of the silylated polyurethane adhesive and for its crosslinking. The crosslinking proceeds in a 2-stage operation. First of all, the alkoxylated silanes (Si—OR) undergo hydrolysis to form silanols (Si—OH), which subsequently undergo a condensation reaction with formation of stable Si—O—Si bonds. Catalysts known from polyurethane chemistry additionally accelerate this reaction.

In order to obtain the required technical adhesive properties, the adhesives are admixed with what are called MQ resins, with the formula $(R^1_3SiO_{1/2})_x(SiO_{4/2})_1$. Referred to as the M unit therein are the $(R^1_3SiO_{1/2})$ units, with the Q unit being the $(SiO_{4/2})$ units. Alternatively to the MQ resins, it is possible to use conventional resins known in the adhesives industry, such as Terpene, terpene-phenol, coumarin, indene or hydrocarbon resins in order to increase the adhesiveness.

Adhesive

The adhesive to be used is based on the following components:

a) a urethane polymer generated from di- or polyfunctional isocyanates (NCO) and di- or polyfunctional alcohols (OH), the NCO/OH ratio being able to be both <1 and >1, the polymer being functionalized with at least one $Si(OR)_{3-x}$ group, where R may be an alkyl or acyl radical and x may be 0 or 1, b) an organometallic catalyst from main group 3, 4 or 5, c) a catalytic amount of water, d) an organopolysiloxane resin with the following formula: $(R^1_3SiO_{1/2})_y(SiO_{4/2})_1$, where $R^1$ is a substituted or unsubstituted monovalent hydrocarbon group, a hydrogen atom or a hydroxyl group and y is a number between 0.5 and 1.2, e) optionally further additives or fillers.

In order to achieve the necessary technical adhesive properties, the formulations described are admixed with what are called MQ resins, with the formula $(R^1_3SiO_{1/2})_y(SiO_{4/2})_1$. Referred to as the M unit therein are the $(R^1_3SiO_{1/2})$ units, with the Q unit being the $(SiO_{4/2})$ units. Each $R^1$ independently of the others is a monovalent saturated hydrocarbon group, a monovalent unsaturated hydrocarbon group, a monovalent halogenated hydrocarbon group, a hydrogen atom or a hydroxyl group. The ratio of M units to Q units (M:Q) is preferably in the range from 0.5 to 1.2.

The MQ resins are advantageously resins having a weight-average molecular weight $M_w$ of 500 g/mol≤$M_w$≤100 000 g/mol, preferably of 1000 g/mol≤$M_w$≤25 000 g/mol, the average molecular weight $M_w$ data in this specification relating to the determination by gel permeation chromatography (see experimental section).

It has emerged as being favorable if adhesives are used in which the proportional ratio—based on percent by weight—of silylated PU adhesive to MQ resin is in the range from 10:90 to 90:10, preferably in the range from 40:60 up to 90:10.

MQ resins are freely available commercially. Mention may be made here, by way of example, of the following: SL 160, SL 200, DC 2-7066 from Dow Corning, SR 545, SR 1000, 6031 SL from Momentive Performance Materials, and CRA 17, CRA 42, and MQ Resin 803 from Wacker.

An additionally advantageous formulation of the adhesive is based on the following components:

a) a urethane polymer generated from di- or polyfunctional isocyanates (NCO) and di- or polyfunctional alcohols (OH), the NCO/OH ratio being able to be both <1 and >1, the polymer being functionalized with at least one $Si(OR)_{3-x}$ group, where R is an alkyl or acyl radical and x is 0 or 1, b) an organometallic catalyst from main group 3, 4 or 5, c) a catalytic amount of water, a tackifying resin based on turpenes, terpene-phenoles, coumarins, indenes or hydrocarbons, d) optionally further additives or fillers.

It is advantageous here to use the resins that are known in the adhesives industry, such as terpene, terpene-phenolic, coumarin, indene or hydrocarbon resins in order to increase the adhesiveness. Particularly advantageous is the use of resins having a softening range of 80 to 150° C. At this point mention may be made, by way of example, of the following: KE-311 Arakawa Technical Industries and Kristalex F85, Kristalex F 100 and Kristalex 115 from Eastmen Chemical Company.

Further Blend Components

As further additives it is possible typically to utilize the following:

primary antioxidants, such as, for example, sterically hindered phenols secondary antioxidants, such as, for example, phosphites or thioethers in-process stabilizers, such as, for example, C-radical scavengers light stabilizers, such as, for example, UV absorbers or sterically hindered amines processing auxiliaries fillers, such as, for example, silicon dioxide, glass (ground or in the form of beads), aluminum oxides or zinc oxides, the fillers being ground to such a small size that they are optically invisible plasticizers, such as, for example, liquid resins, plasticizer oils or liquid polymers of low molecular mass, such as, for example, low molecular mass polybutenes having molar masses <1500 g/mol (number average)

The pressure-sensitive tack of the PSAs may optionally be generated only by thermal activation or by solvent activation.

In addition to the water-catalyzed crosslinking by means of the trialkoxysilyl end groups (SiOR), these adhesives can also be crosslinked by actinic radiation, in particular electron beams. If so, in the case of application from solution, the solvent is first removed at a temperature of 70-100° C. in a residence time of at least 1.5 minutes. This is followed by crosslinking with an electron beam dose of at least 10 kGy. This mode of crosslinking is particularly advantageous since it allows the cohesion to be adjusted almost infinitely, without adverse effect on the properties of tack and adhesion.

Figure 2:
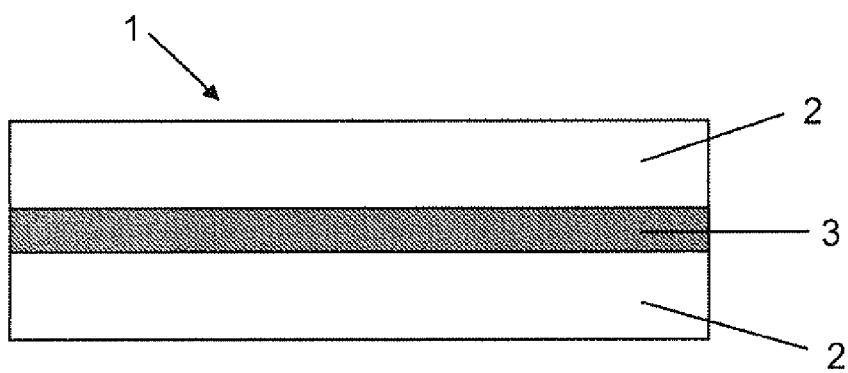
Figure 3:
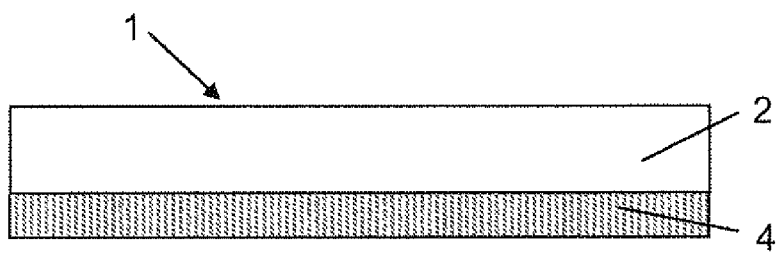
Figure 4:
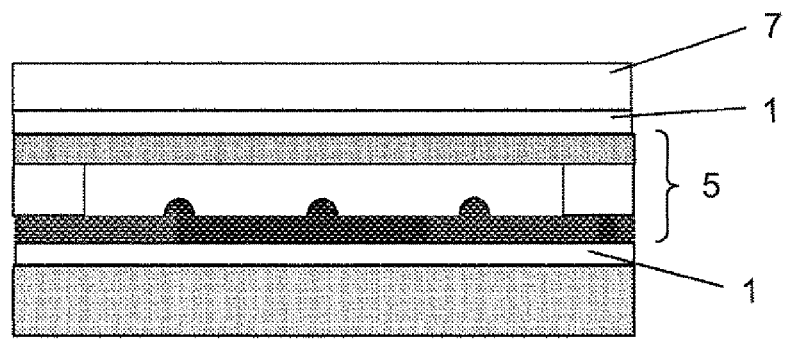
Figure 5:
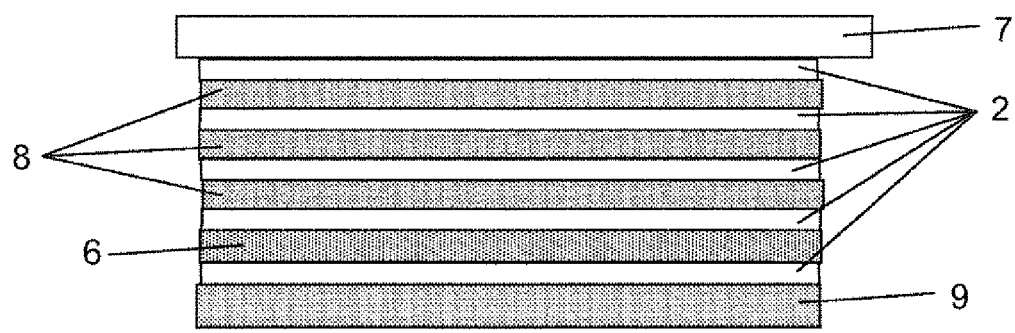

Further details, objectives, features, and advantages of the present invention will be elucidated in more detail below by reference to preferred exemplary embodiments. In the drawing, FIG. 1 shows a single-sided pressure-sensitive adhesive tape, FIG. 2 shows a double-sided pressure-sensitive adhesive tape, FIG. 3 shows a carrier-free pressure-sensitive adhesive tape (adhesive transfer tape), FIG. 4 shows the bonding of a rear reinforcement plate of a touch panel, FIG. 5 shows the bonding of different layers of a touch panel.

PRODUCT CONSTRUCTION

FIG. 1 shows a single-sided pressure-sensitive adhesive tape 1 for use in the bonding of optical components, more particularly of optical films. The PSA tape 1 has an adhesive layer 2 produced by coating one of the above-described PSAs onto a carrier 3. The PSA coatweight is preferably between 5 and 250 g/m², and the adhesive layer has a thickness in the range of from 50 to 100 μm, preferably in the range of from 50-100 μm or in the range of from 100-250 μm, preferably in the range of in the range of from 150-200 μm. Particularly in the visible region of the light, the PSA has a transmittance of at least 86%, so making it particularly suitable for optical application.

For application in the bonding of optical components, a transparent carrier 2 is also employed as carrier 2. The carrier 2, therefore, is likewise transparent in the region of visible light, thus preferably having a transmittance of likewise at least 86%.

In addition (not shown) it is possible to provide a release film as well, which covers and protects the adhesive layer 2 before the PSA tape 1 is used. The release film is then removed before the adhesive layer 2 is used.

The product construction depicted in FIG. 2 shows a PSA tape 1 having a transparent carrier 3 which is coated on both sides with a PSA and thus has two adhesive layers 2. The PSA coatweight per side is again preferably between 5 and 250 g/m$^2$.

In this embodiment as well it is preferred for at least one adhesive layer 2 to be lined with a release film. In the case of a rolled-up adhesive tape, this release film may optionally also line the second adhesive layer 2. It is also possible, however, for a plurality of release films to be provided.

A further possibility is for the carrier film to be provided with one or more coatings. Moreover, only one side of the PSA tape may be furnished with the PSA described, and another transparent PSA may be used on the other side.

The product construction depicted in FIG. 3 shows a pressure-sensitive adhesive tape 1 in the form of an adhesive transfer tape, i.e., a carrier-free PSA tape 1. For this purpose, the PSA is coated onto one side of a release film 4, to form a pressure-sensitive adhesive layer 2. The PSA coatweight here is typically between 5 and 250 g/m$^2$, preference being given to a coatweight of 25 to 175 g/m$^2$. This pressure-sensitive adhesive layer 2 is optionally also lined on its second side with a further release film. For the use of the PSA tape, the release films are then removed.

As an alternative to release films it is also possible, for example, to use release papers or the like. In such a case, however, the surface roughness of the release paper ought to be reduced, in order to produce a PSA side that is as smooth as possible.

Carrier Films

As carrier films it is possible to use a large number of highly transparent polymer films. Special highly transparent PET films can be used in particular. Suitability is thus possessed, for example, by films from Mitsubishi with the trade name Hostaphan™ or from Toray with the trade name Lumirror™. A further very preferred species of the polyesters is represented by the polybutylene terephthalate films.

Besides polyester films it is also possible to use highly transparent PVC films. These films may include plasticizers in order to increase the flexibility. Moreover, PC, PMMA, and PS films can be used. Besides pure polystyrene, it is also possible to use other comonomers, such as butadiene, for example, in addition to styrene, for the purpose of reducing the propensity to crystallization.

Moreover, polyethersulfone films and polysulfone films can be used as carrier materials. These films are obtainable, for example, from BASF under the trade name Ultrason™ E and Ultrason™ S. It is also possible, furthermore, with particular preference, to use highly transparent TPU films. These films are available commercially, for example, from Elastogran GmbH. Use may also be made of highly transparent polyamide films and copolyamide films, and also of films based on polyvinyl alcohol and polyvinyl butyral.

Besides single-layer films it is also possible to use multilayer films, which are produced by coextrusion, for example. For this purpose it is possible to combine the aforementioned polymer materials with one another.

The films, further, may be treated. Thus, for example, vapor deposition may be performed, with zinc oxide, for example, or else varnishes or adhesion promoters may be applied. One further possible additization is represented by UV protectants, which may be present as additives in the film or may be applied as a protective layer.

The film thickness in one preferred embodiment is between 4 μm and 150 μm, more preferably between 12 μm and 100 μm.

The carrier film may, for example, also have an optical coating. Particularly suitable optical coatings are coatings which reduce the reflection. This is achieved, for example, through a reduction in the refractive index difference for the air/optical coating transition.

Release Film

To protect the open (pressure-sensitive) adhesive it is preferably lined with one or more release films. As well as the release films it is also possible—albeit not very preferably—to use release papers, such as glassine, HDPE or LDPE release papers, for example, which in one embodiment have siliconization as a release layer.

Coating

The (pressure-sensitive) adhesives may be coated from solution. For coating from solution, the (pressure-sensitive) adhesive is dissolved in typical solvents, such as toluene, benzine, heptane, ethyl acetate, butyl acetate, methyl ethyl ketone, methyl isobutyl ketone, etc., and then coated via a coating nozzle or a doctor knife. Particular preference is given to manufacturing the (pressure-sensitive) adhesives from solution, in order to prevent premature crosslinking. However, it is also possible to use all other coating methods which allow solvent-containing coatings.

Use

The above-described (pressure-sensitive) adhesives and (pressure-sensitive) adhesive tapes are suitable particularly for use in optical applications, where preferably permanent bonds are performed with residence times of greater than one month.

One particularly preferred field of use encompasses the adhesive bonding of touch panels and also the production of touch panels. FIG. 4 shows typical adhesive bonds in resistive touch panels. For this purpose it is preferred to use (pressure-sensitive) adhesive transfer tapes, i.e., tapes without carriers. Top film or reinforcement plate, however, may also be used and bonded in the form of a single-sided (pressure-sensitive) adhesive tape with the corresponding carrier.

FIG. 4 shows a touch panel 5 bonded by means of a first pressure-sensitive adhesive tape 1 to a substrate 6, which is a plastic plate or a glass plate, for example. Applied to the touch panel 5 by means of a second pressure-sensitive adhesive tape 1 is then a top film 7, which typically has an antiscratch coat.

FIG. 5 shows typical adhesive bonds for capacitive touch panels. For the bonding of structured ITO films 8, in particular, pressure-sensitive adhesive layers 2 with adhesive coatweights of greater than 50 g/m$^2$ are used, to provide for effective wetting of the structuring.

FIG. 5 additionally shows the bonding of a protective film or of a cellphone window 7, of a substrate 6 as rear reinforcement plate of a capacitive touch panel, and also of a display 9, with the PSA described. Both the PSA itself and the PSA in the form of an adhesive transfer tape may be used as a single-sided PSA tape or else as a double-sided PSA tape with carrier film.

Test Methods

A. Bond Strength

The peel strength (bond strength) was tested in accordance with PSTC-101. The adhesive tape is applied to a glass plate.

A strip of the adhesive tape, 2 cm wide, is bonded by being rolled over back and forth three times with a 2 kg roller. The plate is clamped in, and the self-adhesive strip is peeled via its free end on a tensile testing machine at a peel angle of 180° and at a speed of 300 mm/min. The force is reported in N/cm. In the case of measurement on an adhesive transfer tape, the release film is removed from the tape beforehand. This release film is subsequently replaced by a PET film 23 μm thick.

B. Transmittance

The transmittance is determined at 550 nm in accordance with ASTM D1003. The specimen measured was the assembly made up of optically transparent PSA and glass plate.

C. Haze

The haze is determined in accordance with ASTM D1003.

D. Light Stability

The assembly made up of PSA and glass plate, with a size of 4×20 cm², is irradiated for 250 hours using Osram Ultra Vitalux 300 W lamps at a distance of 50 cm. Following irradiation, the transmittance is determined by test method B.

E. Climatic Cycling Test

The PSA is adhered as a single-sided pressure-sensitive adhesive tape (50 g/m² coatweight, 50 μm PET film of type Mitsubishi RNK 50) to a glass plate, without air bubbles. The dimensions of the test strip are 2 cm width and 10 cm length. The bond strength to glass is determined by test method A.

In parallel, an adhesive assembly of this kind is placed in a climatic cycling cabinet and stored for 1000 cycles. One cycle includes:

storage at −40° C. for 30 minutes
heating to 85° C. within 5 minutes
storage at 85° C. for 30 minutes
cooling to −40° C. within 5 minutes After the climatic cycling test, the bond strength is determined again by test method A.

F. Electrical Conductivity Test

The PSA is adhered as a single-sided pressure-sensitive adhesive tape to an ITO film (Elecrysta®) from Nitto Denko. The dimensions of the ITO film are 12 cm×2 cm. The bond area is 10 cm×2 cm, and so 1 cm remains free for electrical measurements at each end. The assembly is subsequently stored in a climate cabinet for 500 hours at 85° C. and 20% humidity. The surface resistivity is then measured in accordance with DIN 53482. This is followed by a determination of the percentage drop in comparison to untreated ITO film.

G. Gel Permeation Chromatography (GPC)

By means of GPC it is possible to determine the average molar masses ($M_w$) of polymers. For the $M_w$ determination of the MQ resins, the settings used were as follows: eluent toluene; measuring temperature 23° C.; preliminary column PSS-SDV, 5 μm, $10^2$ Å (10 nm), ID 8.0 mm×50 mm; separation: PSS-SDV columns, 5 μm, $10^2$ Å (10 nm) and also $10^3$ Å (100 nm), and $10^6$ Å ($10^5$ nm), each of ID 8.0 mm×300 mm; sample concentration 3 g/l, flow rate 1.0 ml per minute; polydimethylsiloxane standards).

EXAMPLES

Coating operations in the examples took place on a conventional laboratory coating unit for continuous coating. Coating was carried out in an ISO 5 clean room according to ISO standard 14644-1. The web width was 50 cm. The width of the coating gap was variably adjustable between 0 and 1 cm. The length of the heating tunnel was around 12 m. The temperature in the heating tunnel was divisible into four zones, and was freely selectable in each zone between room temperature and 180° C.

Production of the Specimens:

The PSAs were coated from solution onto release film. The adhesive sheet thus obtained was dried and crosslinked and then laminated with a further release film. For the measurement of the bond strength, a release film was replaced by a 23 μm thick PET Film.

Preparation of Adhesives a) Condensation-Crosslinking Adhesives

The solvent-containing silylated PU PSA SPUR⁺ 3.0 PSA from Momentive Performance Chemicals was diluted with ethyl acetate to a solids content of 35%, blended with resin, 0.7% by weight of water, and 0.02% by weight of Formrez UL-28, and stirred for 30 minutes. It was subsequently coated onto a release film using a doctor blade. After drying at 23° C. for 20 min. and for 5 min. at 80° C., a layer of dry silylated PU PSA was obtained on the release film. Coatweights (after drying) of 50, 100, and 150 g/m² were produced (corresponding to layer thicknesses of approximately 50, 100, and 150 μm).

| Example | Resin | Resin addition in % | EBC dose in kGy (acceleration voltage = 100 kV) | Coatweight in g/m² | Bond strength (test A) in N/cm |
|---|---|---|---|---|---|
| 1 | — | — | — | 50 | 4.3 |
| 2 | — | — | 20 | 50 | 4.2 |
| 3 | — | — | — | 100 | 5.1 |
| 4 | — | — | — | 150 | 6.0 |
| 5 | DC 2-7066 | 20 | — | 50 | 5.2 |
| 6 | DC 2-7066 | 20 | 20 | 50 | 5.3 |
| 7 | DC 2-7066 | 20 | — | 100 | 6.2 |
| 8 | DC 2-7066 | 20 | — | 150 | 6.9 |
| 9 | KE-311 | 30 | — | 50 | 4.8 |
| 10 | KE-311 | 30 | 20 | 50 | 4.6 |
| 11 | KE-311 | 30 | — | 100 | 5.7 |
| 12 | KE-311 | 30 | — | 150 | 6.5 |

Preparation of a Reference Example 1

The polymerization was carried out using monomers that had been purified of stabilizers. A 2 l glass reactor conventional for radical polymerizations was charged with 32 g of acrylic acid, 168 g of n-butyl acrylate, 200 g of 2-ethylhexyl acrylate, and 300 g of acetone/isopropanol (97:3 ratio). After nitrogen gas had been passed through the reactor for 45 minutes, with stirring, the reactor was heated to 58° C. and 0.2 g of Vazo67® (DuPont, 2,2'-azodi(2-methylbutyronitrile)) was added. The external heating bath was then heated to 75° C. and the reaction was carried out constantly at this external temperature. After a reaction time of 1 hour a further 0.2 g of Vazo 67® (DuPont, 2,2'-azodi(2-methylbutyronitrile)) was added. After 3 hours and after 6 hours, the batch was diluted with 150 g each time of acetone/isopropanol mixture. In order to reduce the residual initiators, 0.1 g each time of Perkadox 16® (from Akzo Nobel, di(4-tert-butylcyclohexyl) peroxydicarbonate) was added after 8 hours and after 10 hours. After a reaction time of 22 hours, the reaction was discontinued and the batch was cooled to room temperature. This was followed by dilution with isopropanol to a solids content of 30%, and by the addition, with vigorous stirring, of 0.3% by weight of aluminum acetylacetonate. The solution was then coated out onto a release film in the same way as in inventive examples 1-3, and dried at 120° C. for 10 minutes. The coatweight was 50 g/m². The bond strength by test method A was 6.4 N/cm.

Results

Production of the test specimens showed that examples 1-12 all have high bond strengths. The bond strengths are dependent on the coatweight. Reference specimen 1, based on polyacrylate PSA, shows similar bond strengths by test method A. Inventive examples 1-12 demonstrate that all of the examples are suitable for permanent bonds and not for temporary bonds.

For suitability in the optical sector, furthermore, optical measurements were carried out. The translucency is determined in the form of the transmittance by test method B. The clouding of the PSAs is determined by test method C and described by the haze value. The results are collated in table 1 below.

TABLE 1

| Example | Transmittance (test B) in % | Haze (test C) in % |
| --- | --- | --- |
| 1 | 92 | 0.7 |
| 2 | 92 | 0.4 |
| 3 | 92 | 0.6 |
| 4 | 92 | 0.7 |
| 5 | 92 | 0.4 |
| 6 | 92 | 0.5 |
| 7 | 92 | 0.8 |
| 8 | 92 | 0.4 |
| 9 | 92 | 0.6 |
| 10 | 92 | 0.7 |
| 11 | 92 | 0.4 |
| 12 | 92 | 0.5 |
| Reference 1 | 93 | 0.4 |

From the tests it is evident that all of the inventive examples have high transmittance values of 92%, which is reduced by the reflection of light. In the case of glass/glass bonds, with the subtraction of the reflection losses, transmittance values of greater than 99% can be measured. The polyacrylate-based reference example shows similar transmittance values. The silylated PUR-PSAs are therefore suitable for high optical transmissions. The haze measurements according to test method C provide confirmation of this. The haze values measured are below 1% for all of the PSAs, and therefore meet extremely exacting requirements.

Subsequently, furthermore, various aging investigations were carried out. First, a light stability test was carried out by test method D. This test examines whether long sunlight irradiation causes a discoloration or yellowing. This is particularly important for optical applications which are subject to long-term irradiation, such as by a display, for example, or are used in the outdoor sector. The results are summarized in table 2.

TABLE 2

| Example | Light stability (test D) transmittance in % |
| --- | --- |
| 1 | 92 |
| 2 | 92 |
| 3 | 92 |
| 4 | 92 |
| 5 | 92 |
| 6 | 92 |
| 7 | 92 |
| 8 | 92 |
| 9 | 92 |
| 10 | 92 |
| 11 | 92 |
| 12 | 92 |
| Reference 1 | 91 |

From table 2 it is apparent that all examples, and reference example 1, have a stable transmittance, and there is no drop, or only a very small drop, in the case of reference example 1, in the transmittance.

A further aging test includes climatic cycling. Here, the exposure of the adhesive to very different climatic conditions is simulated, as may be the case, again, for end applications in the cellphone segment. The climatic cycling test was carried out by test method E. The results are set out in table 3.

TABLE 3

| Example | Bond strength (test A) in N/cm | Bond strength after climatic cycling test (test E) in N/cm |
| --- | --- | --- |
| 1 | 4.3 | 4.4 |
| 2 | 4.2 | 4.4 |
| 3 | 5.1 | 5.4 |
| 4 | 6.0 | 6.2 |
| 5 | 5.2 | 5.5 |
| 6 | 5.3 | 5.5 |
| 7 | 6.2 | 6.5 |
| 8 | 6.9 | 7.2 |
| 9 | 4.8 | 5.1 |
| 10 | 4.6 | 4.8 |
| 11 | 5.7 | 5.9 |
| 12 | 6.5 | 6.9 |
| Reference 1 | 6.4 | 6.9 |

The measurements from table 3 show a very stable level of bonding for all inventive examples. The only marked feature, in the case of reference example 1, was the formation of bubbles that was found, probably caused by outgassing from the PET film. Examples 1 to 12 did not exhibit any such problem, in contrast. Nor in any of the example were there instances of lifting or the like. This is a further indicator of sufficiently high bonding strength.

As a last measurement, a bond on an ITO film was performed once again with all of the inventive and reference examples. ITO films are used very frequently for producing touch panels. The objective here is that the electrical conductivity of the ITO layer is not adversely affected even after bonding with a PSA. Test method F measures the bonding over a prolonged time period. It provides a simulation of whether there are aging effects which adversely affect the electrical conductivity over time. The loss in percent is determined by comparing the fresh measurement with the stored assembly. For touch panel applications, losses of less than 5% are necessary in order to possess high suitability. The results for these investigations are summarized in table 4.

TABLE 4

| Example | Electrical conductivity test (test F) loss in % |
| --- | --- |
| 1 | <1 |
| 2 | <1 |
| 3 | <1 |
| 4 | <1 |
| 5 | <1 |
| 6 | <1 |
| 7 | <1 |
| 8 | <1 |
| 9 | <1 |
| 10 | <1 |
| 11 | <1 |
| 12 | <1 |
| Reference 1 | 15 |

The results of measurement make it clear that the comparative example, reference 1, causes a significant drop in electrical conductivity. Reference example 1 is based on a polyacrylate and contains acrylic acid groups. Examples 1 to 12, in contrast, display virtually no loss in electrical conductivity of ITO. Examples 1-12 are therefore outstandingly suitable for the bonding of ITO films and have significant advantages over commercial acrylate PSAs which are likewise employed for ITO bonding in the optical segment.

In summary, the results of measurement demonstrate that the inventive PSAs and also their inventive use are extremely well suited to the bonding of touch panels or to the bonding of ITO films for capacitive touch panels. The PSAs have significant advantages over existing PSAs based, for example, on polyacrylate.

The invention claimed is:

1. An adhesive for the adhesive bonding of optical components comprising silylated polyurethanes in the form of an adhesive tape, having at least one adhesive layer, said adhesive layer having a thickness in the range of from 150-200 µm, the adhesive having an ASTM D 1003 transmittance of more than 86% and an ASTM D 1003 haze of less than 5%.

* * * * *